US009893821B1

(12) United States Patent
Berry et al.

(10) Patent No.: US 9,893,821 B1
(45) Date of Patent: Feb. 13, 2018

(54) NETWORKING DEVICE TESTING SYSTEM

(71) Applicant: Dell Products L.P., Round Rock, TX (US)

(72) Inventors: Andrew Berry, Austin, TX (US); Victor B. Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/355,889

(22) Filed: Nov. 18, 2016

(51) Int. Cl.
*H04B 3/46* (2015.01)
*H04B 17/00* (2015.01)
*H04Q 1/20* (2006.01)
*H04B 17/30* (2015.01)
*H01R 24/28* (2011.01)
*H01R 24/20* (2011.01)

(52) U.S. Cl.
CPC .......... *H04B 17/30* (2015.01); *H01R 24/20* (2013.01); *H01R 24/28* (2013.01); *H04B 3/46* (2013.01)

(58) Field of Classification Search
CPC .......... H04B 17/30; H04B 3/46; H01R 24/20; H01R 24/28; G01R 31/31907; G06F 11/261; G06F 11/273; H04J 3/14; H04L 1/24; H04L 43/50; H04M 1/24; H04M 2203/055; H04M 3/2209
See application file for complete search history.

(56) References Cited

U.S. PATENT DOCUMENTS

| 5,363,493 | A  | * | 11/1994 | Unverrich | ............ | H04L 12/433 |
| | | | | | | 370/245 |
| 6,075,773 | A  | * | 6/2000 | Clark | ...................... | H04L 43/50 |
| | | | | | | 370/241 |
| 2003/0033406 | A1 | * | 2/2003 | John | ....................... | H04L 43/50 |
| | | | | | | 709/224 |
| 2005/0050189 | A1 | * | 3/2005 | Yang | ................... | H04L 41/0806 |
| | | | | | | 709/223 |
| 2005/0060612 | A1 | * | 3/2005 | Bohan | .................. | G06F 11/273 |
| | | | | | | 714/25 |
| 2006/0203460 | A1 | * | 9/2006 | Aviv | .................... | H05K 7/1492 |
| | | | | | | 361/788 |
| 2007/0189171 | A1 | * | 8/2007 | Abrahams | .......... | H04L 43/0847 |
| | | | | | | 370/241 |
| 2007/0245199 | A1 | * | 10/2007 | Pochowski | .......... | G06F 11/263 |
| | | | | | | 714/742 |

(Continued)

*Primary Examiner* — Daniel Washburn
*Assistant Examiner* — Amneet Singh
(74) *Attorney, Agent, or Firm* — Haynes and Boone, LLP

(57) ABSTRACT

A networking device testing system includes a testing device that is connected to a load generator device and a networking device. The testing device includes a testing device chassis. First testing device connectors are included on the testing device chassis and are each connected to a respective networking device connectors on the networking device. Pairs of the first testing device connectors are coupled together such that traffic received through one of the first testing device connectors in each pair is directed to the other of the first testing device connectors in each pair. Second testing device connectors are included on the testing device chassis. At least one of the second testing device connectors is connected to the load generator device. Each of the second testing device connectors is coupled to a respective one of the first testing device connectors.

20 Claims, 17 Drawing Sheets

(56) References Cited

U.S. PATENT DOCUMENTS

| | | | |
|---|---|---|---|
| 2008/0123550 A1* | 5/2008 | Pitis | H04L 43/50 370/253 |
| 2012/0027021 A1* | 2/2012 | Eggerl | H04L 45/60 370/401 |
| 2013/0149912 A1* | 6/2013 | Oberski | H01R 24/64 439/676 |
| 2013/0242760 A1* | 9/2013 | Peyton | H04Q 1/136 370/250 |
| 2013/0294255 A1* | 11/2013 | Olgaard | H04W 48/06 370/242 |

* cited by examiner

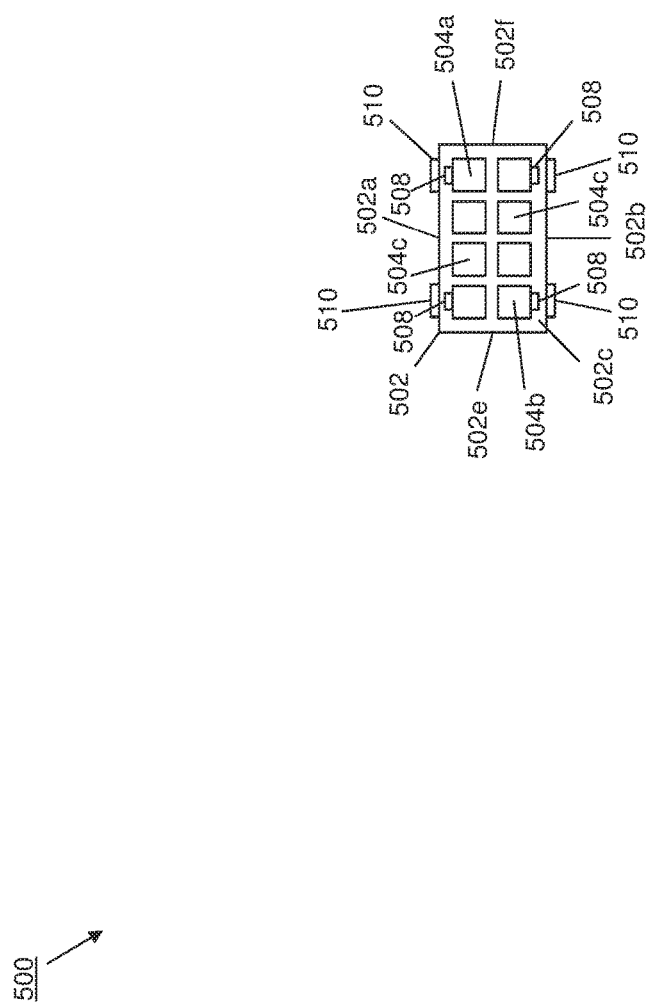

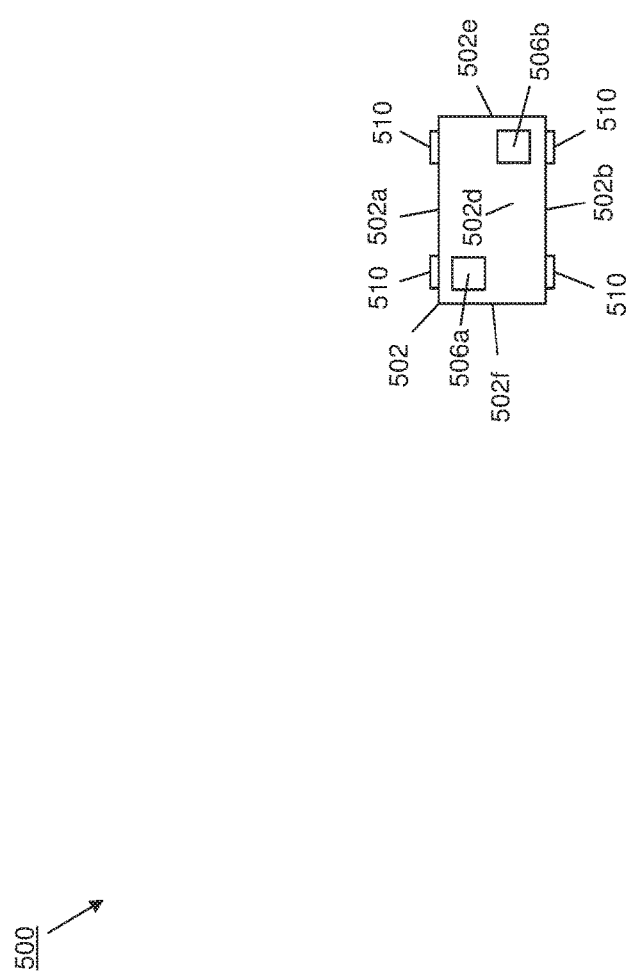

NETWORKING DEVICE TESTING SYSTEM

BACKGROUND

The present disclosure relates generally to information handling systems, and more particularly to a testing system for networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, networking devices, may undergo a variety of performance and quality testing. For example, switch devices may be subject to "snake" tests that are used to analyze and ensure the stability of the switch device with regards to load capabilities, throughput capabilities, latency, RFC 2544 performance, and/or other switch device characteristics. In order to perform snake testing on a switch device having, for example, 48 testing ports, a user must prepare the switch device such that each pairs of ports between the $1^{st}$ port and the $48^{th}$ port are connected via a respective cable (e.g., a $2^{nd}$ port and a $3^{rd}$ port must be connected by a $1^{st}$ cable, a $4^{th}$ port and a $5^{th}$ port must be connected by a $2^{nd}$ cable, and so on up to a $46^{th}$ port and $47^{th}$ port being connected by a $23^{rd}$ cable). The $1^{st}$ port and the $48^{th}$ port are then connected via respective cables to a load generator device, and the load generator device may be operated to send traffic to the $1^{st}$ port such that it is routed by the switch device through all of the cabled ports and received back from the $48^{th}$ port. The load generator device may also be operated to send traffic to the $48^{th}$ port such that it is routed by the switch device through all of the cabled ports and received back from the $1^{st}$ port. These bi-directional traffic flows may then be analyzed to determine the switch characteristics described above. The preparation of the switch device with the cabling, and the removal of the cabling from the switch device, is a time consuming process that can be subject to error and that typically takes much longer than the actual testing itself.

Accordingly, it would be desirable to provide an improved testing system for networking devices.

SUMMARY

According to one embodiment, a testing device includes a testing device chassis; a plurality of first testing device connectors that are included on the testing device chassis and that are each configured to connect to a respective one of a plurality of networking device connectors on a networking device, wherein pairs of the plurality of first testing device connectors are coupled together such that traffic received through one of the first testing device connectors in each pair is directed to the other of the first testing device connectors in each pair; and a plurality of second testing device connectors that are included on the testing device chassis, wherein at least one of the plurality of second testing device connectors is configured to connect to a load generator device, wherein each of the plurality of second testing device connectors is coupled to a respective one of the plurality of first testing device connectors.

BRIEF DESCRIPTION OF THE DRAWINGS

FIG. 5A is a rear view illustrating an embodiment of a testing device.

FIG. 5B is a front view illustrating an embodiment of the testing device of FIG. 5A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
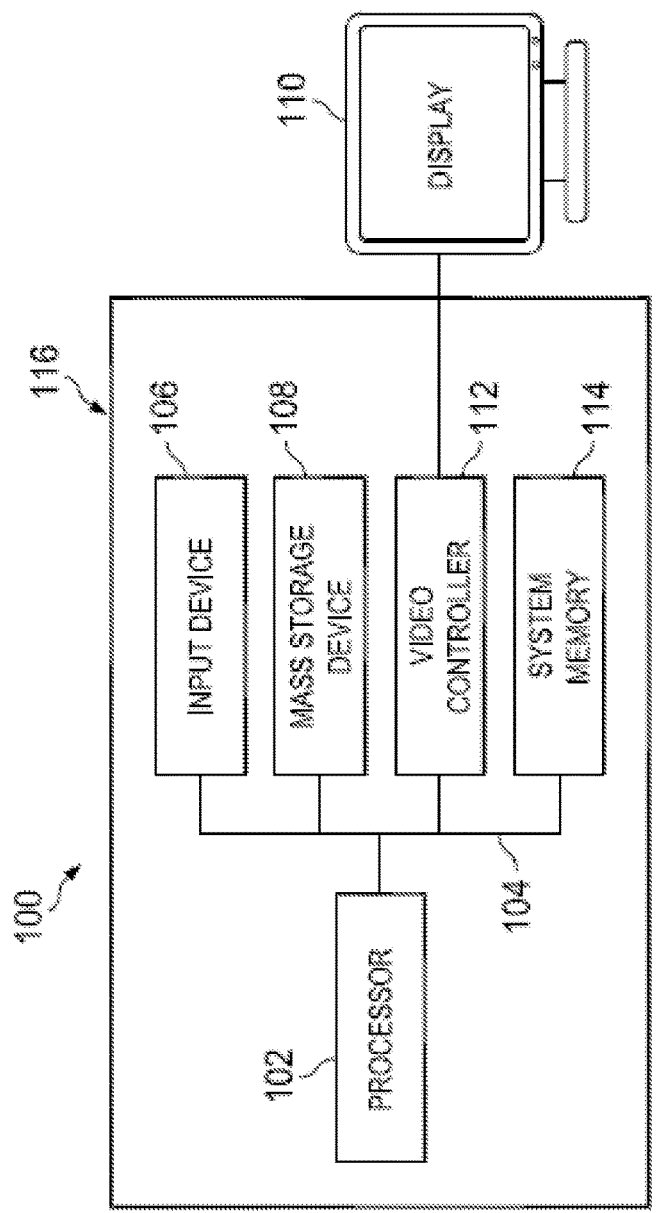
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
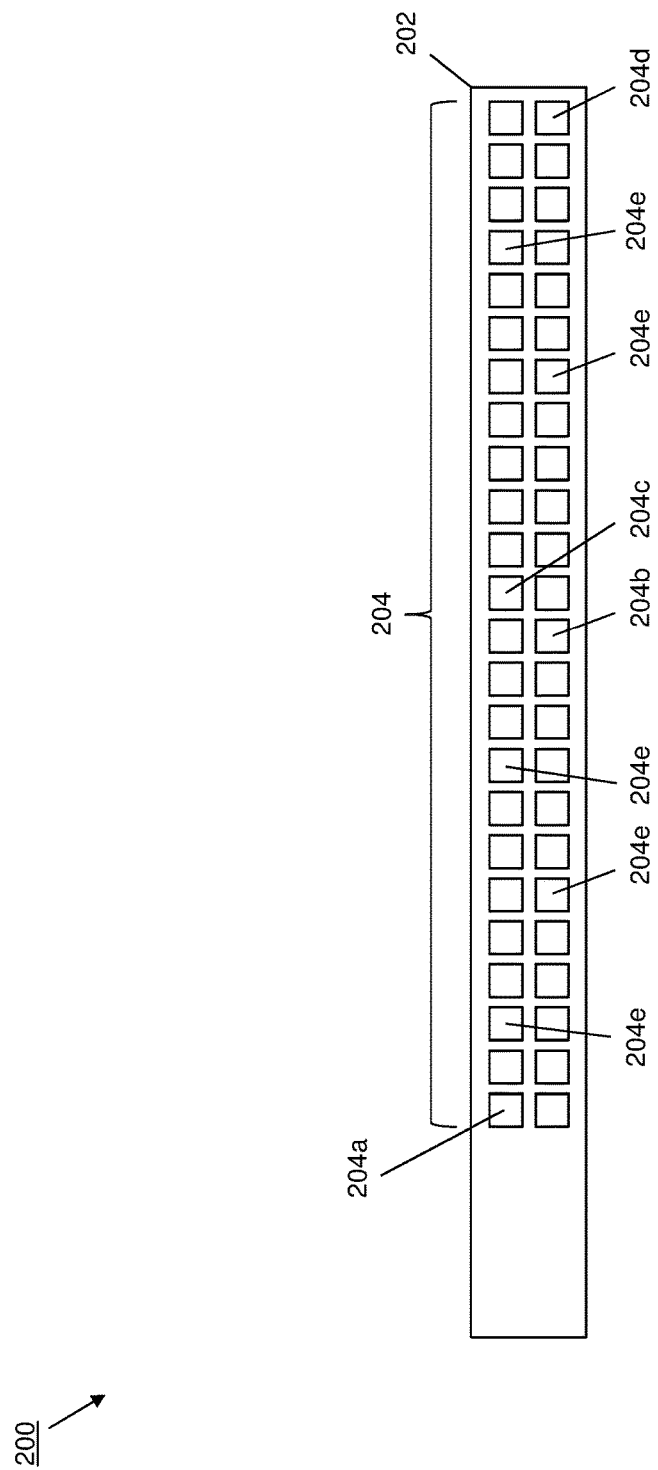
FIG. 2 is a front view illustrating an embodiment of a networking device.

Referring now to FIG. 2, an embodiment of a networking device 200 is illustrated. In an embodiment, the networking device 200 may be the IHS 100 discussed above with reference to FIG. 1, and/or may include some or all of the components of the IHS 100. For example, the networking device 200 may be a switch device, a router device, an access point, and/or other networking devices known in the art. Furthermore, while the networking device testing system of present disclosure is discussed as being used to test networking devices, other computing devices with multiple connectors may benefit from the testing devices provided according to the teachings of the present disclosure and thus will fall within its scope. In the illustrated embodiment, the networking device 200 includes a chassis 202 that houses the components of the networking device 200. A plurality of networking device connectors 204 are included on the chassis 202 of the networking device 200, and are designated by the networking device connector 204a, the networking device connector 204b, the networking device connector 204c, the networking device connector 204d, and the remaining networking device connectors 204e for ref- erence below. In different embodiments, the networking device connectors 204 may each be the same (e.g., Registered Jack-45 (RJ-45) female connectors or other networking device connectors known in the art), or may include some connectors that are different than other connectors while remaining within the scope of the present disclosure. Furthermore, the networking device 200 may include other connectors such as uplink connectors, stacking connectors, and/or other connectors known in the art.

Figure 3:
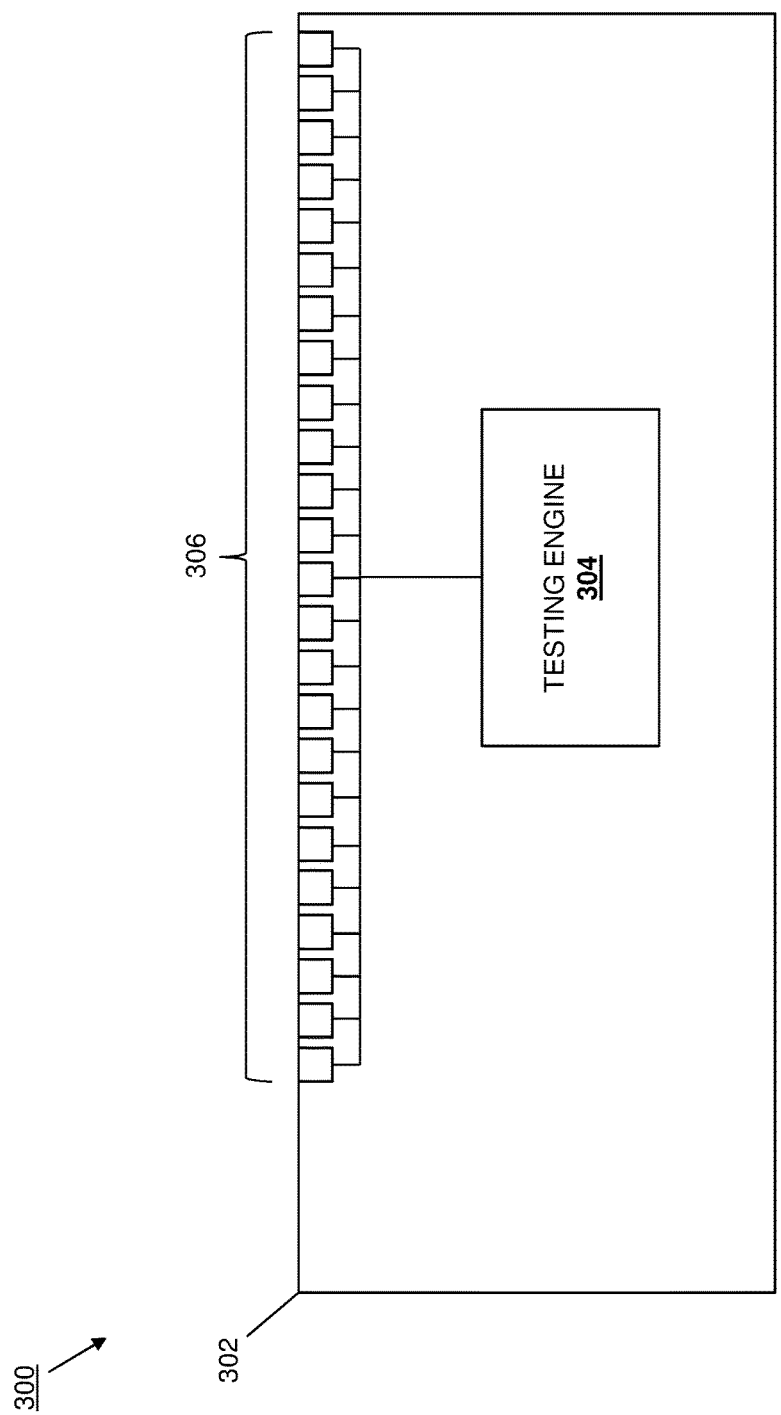
FIG. 3 is a schematic view illustrating an embodiment of a networking device.

Referring now to FIG. 3, an embodiment of a networking device 300 is illustrated that may be the networking device 200 discussed above with reference to FIG. 2. As such, the networking device 300 may be the IHS 100 discussed above with reference to FIG. 1 and/or may include some or all of the components of the IHS 100, and in specific examples may be a switch device, a router device, an access point, other networking devices known in the art, and/or other computing devices with multiple connectors. In the illustrated embodiment, the networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, causes the processing system to provide a testing engine 304 that is configured to perform the functions of the testing engines and networking devices discussed below. A plurality of networking device connectors 306 are included on the chassis 202 of the networking device 300 and are coupled to the testing engine 304 (e.g., via a coupling between the networking device connectors 304 and the processing system). The networking device connectors 306 may be substantially similar to the networking device connectors 204 discussed above with reference to FIG. 2. While specific networking devices have been illustrated and described, one of skill in the art in possession of the present disclosure will recognize that a wide variety of modification to the networking devices illustrated and described herein (e.g., more or fewer networking device connectors, other components that provide other functionality of the networking device, etc.) will fall within the scope of the present disclosure.

Referring now to FIGS. 4A, 4B, 4C, 4D, and 4E, an embodiment of a testing device 400 is illustrated. As discussed further below, FIGS. 4A-4E illustrate a specific example of a testing device 400 with 24 testing device connectors (e.g., a "24 connector testing device"), and a variety of different testing devices may be provided with different numbers of testing device connectors (e.g., 4 connector testing devices, 8 connector testing devices, 16 connector testing devices, 32 connector testing devices, 48 connector testing devices, and so on) so that combinations of the testing devices may be used on networking devices having different numbers and/or configurations of networking device connectors. In the illustrated embodiment, the testing device 400 includes a base 402 having a top surface 402a, a bottom surface 402b located opposite the base 402 from the top surface 402a, a rear surface 402c extending between the top surface 402a and the bottom surface 402b, a front surface 402d located opposite the base 402 from the rear surface 402c and extending between the top surface 402a and the bottom surface 402b, and a pair of sides surfaces 402e and 402f that are located opposite the base 402 from each other and that extend between the top surface 402a, the bottom surface 402b, the rear surface 402c, and the front surface 402d.

A plurality of first testing device connectors are provided on and/or accessible via the rear surface 402c, and are designated the first testing device connector 404a, the first testing device connector 404b, and the remaining first testing device connectors 404c for reference below. In the illustrated embodiment, each of the first testing device connectors 404a, 404b, and 404c are substantially the same (e.g., Registered Jack-45 (RJ-45) male connectors or other networking device connectors known in the art) and extend from the front surface 402a of the base 402, but in other embodiments may include some connectors that are different than other connectors while remaining within the scope of the present disclosure. A plurality of second testing device connectors are provided on and/or accessible via the front surface 402d, and are designated the second testing device connector 406a and the second testing device connector 406b for reference below. In the illustrated embodiment, each of the second testing device connectors 406a and 406b are substantially the same (e.g., Registered Jack-45 (RJ-45) female connectors or other networking device connectors known in the art), but in other embodiments may include some connectors that are different than other connectors while remaining within the scope of the present disclosure.

Figure 4A:
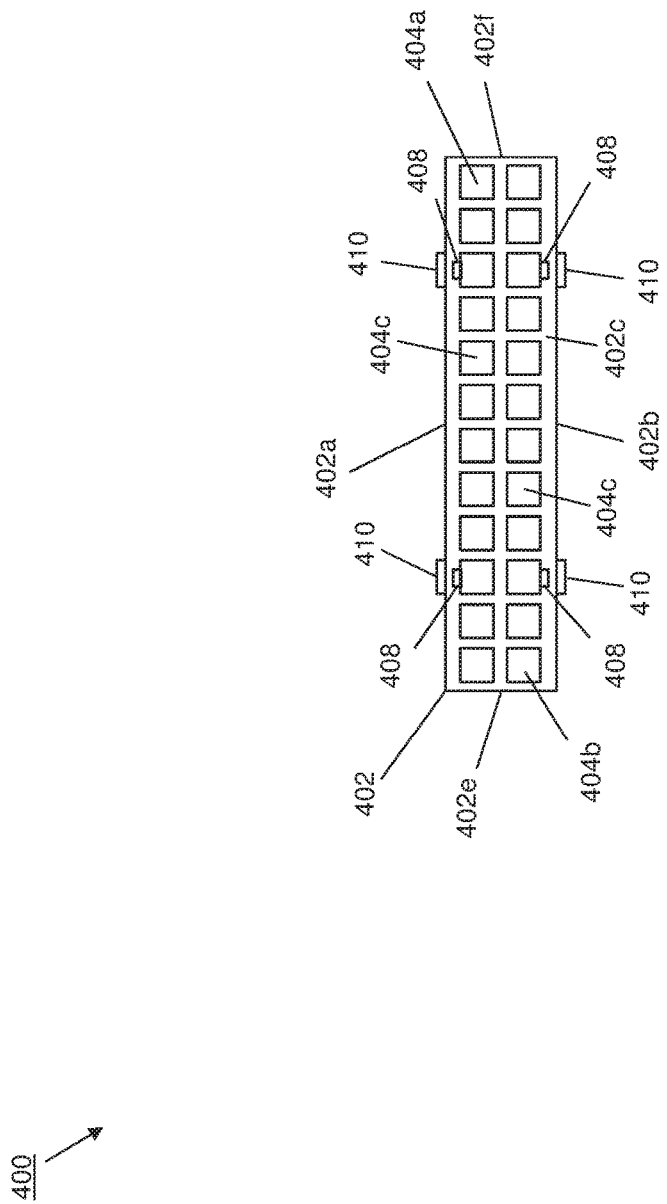
FIG. 4A is a rear view illustrating an embodiment of a testing device.
Figure 4B:
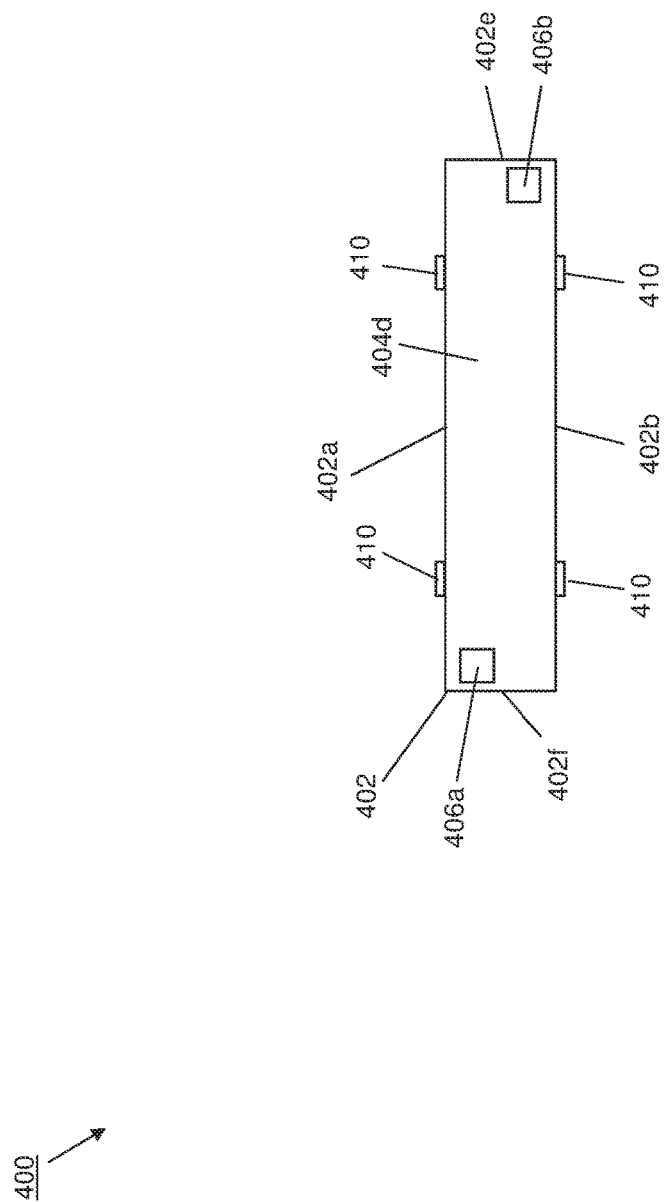
FIG. 4B is a front view illustrating an embodiment of the testing device of FIG. 4A.
Figure 4C:
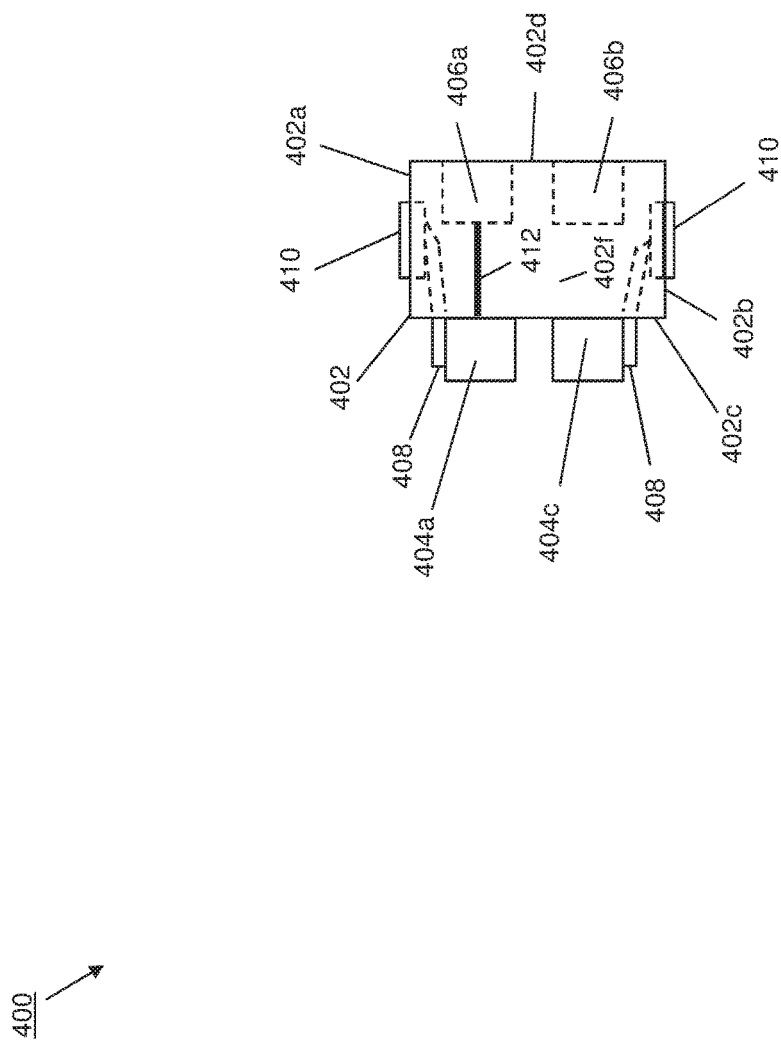
FIG. 4C is a partial cross-sectional side view illustrating an embodiment of the testing device of FIGS. 4A and 4B.

The testing device 400 also includes a networking device securing subsystem that, in the illustrated embodiment, is provided on the base 402 and includes securing members 408 that are located adjacent respective first testing device connectors, and one or more securing member actuators 410 that are configured to engage and disengage the securing members 408 to allow the securing members 408 to couple to and decouple from a networking device, as discussed in further detail below. FIG. 4C illustrates a specific embodiment of the networking device securing subsystem, with the securing members 408 located adjacent respective first testing device connectors and extending into the base 402 such that the securing member actuators 410 may engage at least a portion of the securing members 408. For example, the securing members 408 may be provided by conventional securing tabs on an RJ-45 male connector that extend into the base 402 and that are configured to engage an RJ-45 female connector (e.g., on the networking device 200) to secure the RJ-45 male connector in the RJ-45 female connector, and the securing member actuator(s) 410 may be moveable relative to the base 402 in order to engage the securing members 408 to disengage them from the RJ-45 female connector to allow the RJ-45 male connector to be removed from the RJ-45 female connector. In some embodiments, the securing members 408 may only be provided adjacent particular first testing device connectors 404c, with no securing members (e.g., no RJ-45 male connector securing tabs) provided adjacent the remaining first testing device connectors, as illustrated. However, while a specific example of a networking device securing subsystem is illustrated and described in FIG. 4C, one of skill in the art in possession of the present disclosure will recognize that a wide variety of different components and configurations may be used to provide a networking device securing subsystem that will enable the functionality discussed below and thus fall within the scope of the present disclosure.

Figure 4D:
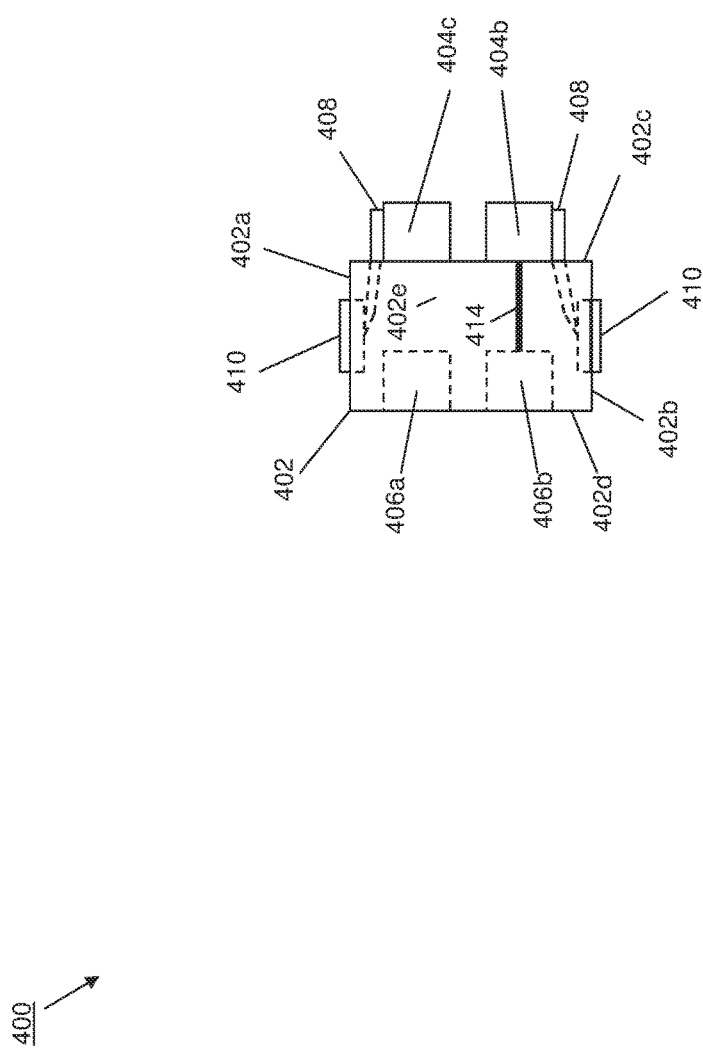
FIG. 4D is a partial cross-sectional side view illustrating an embodiment of the testing device of FIGS. 4A and 4B.
Figure 4E:
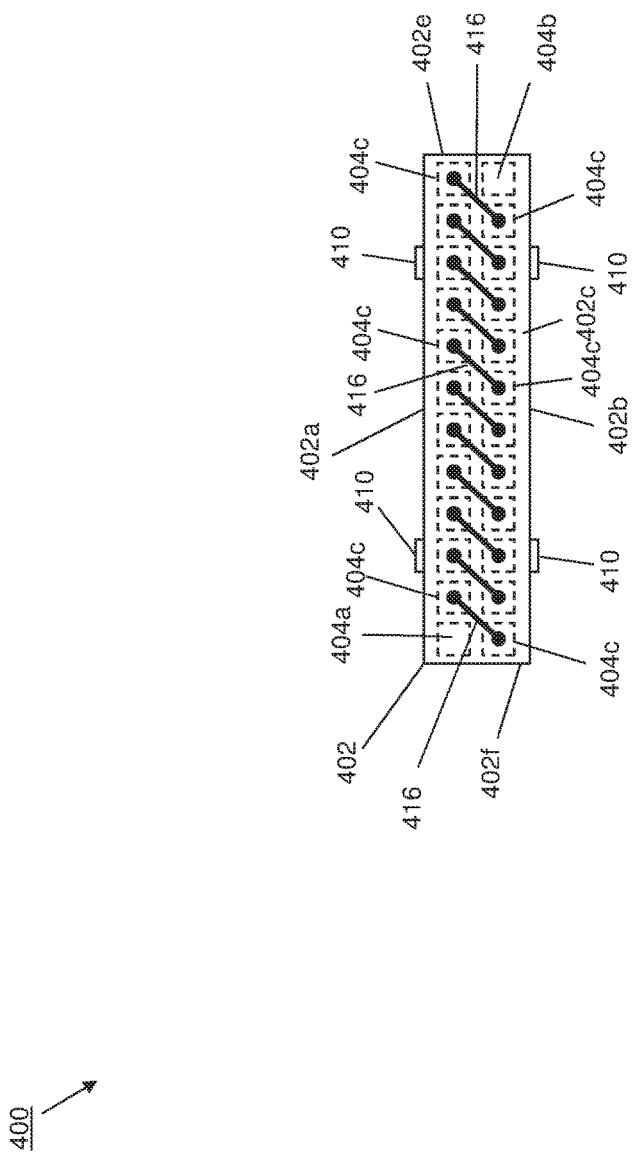
FIG. 4E is a partial cross sectional front view illustrating an embodiment of the testing device of FIGS. 4A, 4B, and 4C.

Referring now to FIGS. 4C, 4D, and 4E, an internal view of the base 402 of the testing device 400 is illustrated to provide an example of the connections between the first testing devices connectors 404a and 404b and the second testing device connectors 406a and 406b, as well as the connections between the first testing device connectors 404c. As illustrated in the embodiment of FIG. 4C, the first testing device connector 404a may be connected to the second testing device connector 406a by an interconnect 412 that is configured to transmit data traffic between the first testing device connector 404a and the second testing device connector 406a as discussed below. Similarly, as illustrated in the embodiment of FIG. 4D, the first testing device connector 404b may be connected to the second testing device connector 406b by an interconnect 414 that is configured to transmit data traffic between the first testing device connector 404b and the second testing device connector 406b as discussed below. While the interconnects 412 and 414 are illustrated as physical interconnects (e.g., cabling, wiring, traces on a circuit board, etc.), the functionality of transmitting signals between first testing device connectors and second testing device discussed below may be provided in a variety of manners including, for example, configuring the testing device 400 to provide a "pass-through" connection, defining a channel in the base 402 of the testing device 400 that allows a cabled (or other) connector to extend through the base 402 to engage a networking device connector on the networking device 200, and/or configuring the testing device 400 in other manners that would be apparent to one of skill in the art in possession of the present disclosure.

As illustrated in FIG. 4E, pairs of the first testing device connectors 404c may be connected together by respective interconnects 416 that are configured to direct data traffic between the first testing device connector 404c as discussed below. Similarly as discussed above with the first testing devices connectors 404a and 404b and the second testing device connectors 406a and 406b, the first testing device connectors 404c may be connected together by cabling or wiring provided between the connectors. However, in other embodiments, a circuit board may be provided in the testing device 400, with the first testing device connectors 404c mounted to that circuit board, and traces on the circuit board providing the interconnects 416 between those first testing device connectors 404c. Similarly, the first testing devices connectors 404a and 404b and the second testing device connectors 406a and 406b may be mounted to that circuit board and connected via traces while remaining within the scope of the present disclosure. However, while specific examples of the testing device 400 have been illustrated and described, one of skill in the art will recognize that a wide variety of modification to the testing device 400 illustrated in FIGS. 4A-4E may be made while still providing the functionality and benefits discussed below, and thus will fall within the scope of the present disclosure.

For example, with reference to FIGS. 5A and 5B, an embodiment of a testing device 500 is illustrated with 8 testing device connectors (i.e., an "8 connector testing device"), and one of skill in the art in possession of the present disclosure will recognize that the testing device 500 may be used with the testing device 400 of FIGS. 4A-4E in a specific embodiment to perform the testing discussed below on a networking device with 32 networking device connectors. Furthermore, the testing device 500 is just one example of a testing device with a particular number of connectors that allow for combinations of the testing devices of the present disclosure to be used as discussed below. In the illustrated embodiment, the testing device 500 includes a base 502 having a top surface 502a, a bottom surface 502b located opposite the base 502 from the top surface 502a, a front surface 502c extending between the top surface 502a and the bottom surface 502b, a rear surface 502d located opposite the base 502 from the front surface 502c and extending between the top surface 502a and the bottom surface 502b, and a pair of sides surfaces 502e and 502f that are located opposite the base 502 from each other and that extend between the top surface 502a, the bottom surface 502b, the front surface 502c, and the rear surface 502d.

A plurality of first testing device connectors are provided on and/or accessible via the front surface 502c, and are designated the first testing device connector 504a, the first testing device connector 504b, and the remaining first testing device connectors 504c, each of which may be used similarly as the corresponding first testing device connector 404a, first testing device connector 404b, and first testing device connectors 404c on the testing device 400 in the manner described below. In the illustrated embodiment, each of the first testing device connectors 504a, 504b, and 504c are substantially the same (e.g., Registered Jack-45 (RJ-45) male connectors or other networking device connectors known in the art) and extend from the front surface 502a of the base 502, but in other embodiments may include some connectors that are different than other connectors while remaining within the scope of the present disclosure. A plurality of second testing device connectors are provided on and/or accessible via the rear surface 502d, and are designated the second testing device connector 506a and the second testing device connector 506b, each of which may be used similarly to the corresponding second testing device connector 506a and second testing device connector 506b on the testing device 400 in the manner described below. In the illustrated embodiment, each of the second testing device connectors 506a and 506b are substantially the same (e.g., Registered Jack-45 (RJ-45) female connectors or other networking device connectors known in the art), but in other embodiments may include some connectors that are different than other connectors while remaining within the scope of the present disclosure.

The testing device 500 also includes a networking device securing subsystem that, in the illustrated embodiment, is provided on the base 502 and includes securing members 508 that are located adjacent respective first testing device connectors, and one or more securing member actuators 510 that are configured to engage and disengage the securing members 508 to allow the securing members 508 to couple to a networking device, similarly as discussed in further detail below with regard to the networking device securing subsystem on the testing device 400. While not explicitly illustrated, the networking device securing subsystem on the testing device 500 may operate similarly to the networking device securing subsystem on the testing device 400 as described with reference to FIG. 4C above. Furthermore, while no internal view of the testing device 500 is provided, connections between the first testing devices connectors 504a and 504b and the second testing device connectors 506a and 506b, as well as connections between the first testing device connectors 504c, may be provided in the testing device 500 in substantially the same manner as described for the testing device 400 with reference to FIGS. 4C, 4D and 4E above. One of skill in the art in possession of the present disclosure will recognize how the testing device 500 illustrated in FIG. 5 is but one of a variety of different testing devices that may be provided according to the teachings of the present disclosure in order to allow the network device testing discussed below to be performed on any of a variety of different networking devices having different numbers of networking device connectors.

Figure 6:
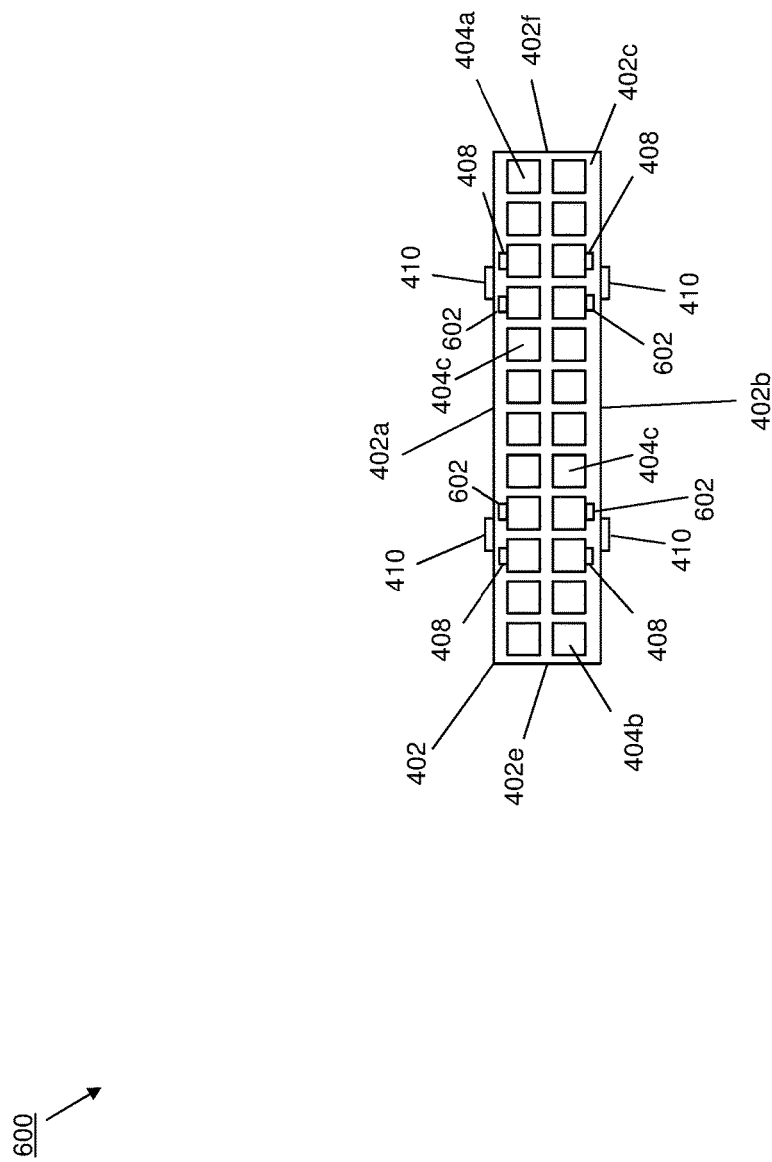
FIG. 6 is a rear view illustrating an embodiment of a testing device.

In another example, with reference to FIG. 6, an embodiment of a testing device 600 is illustrated that is substantially similar to the testing device 400 of FIGS. 4A-4E, but with a modified network device securing subsystem. As such, components of the testing device 600 that are similar to the testing device 400 have provided with the same reference numbers. The networking device securing subsystem of the testing device 600 is provided on the base 402 and includes securing members 408 that are located adjacent respective first testing device connectors 404c, securing members 602 that are located adjacent respective first testing device connectors 404c, and one or more securing member actuators 410 that are configured to engage and disengage the securing members 408 and 602 to allow the securing members 408 and 602 to couple to a networking device, similarly as discussed in further detail below with regard to the network device securing subsystem on the testing device 400. While not explicitly illustrated, the networking device securing subsystem on the testing device 600 may operate similarly to the networking device securing subsystem on the testing device 400 as described with reference to FIG. 4C above, with the exception that additional securing members (i.e., the securing members 602) are used to secure the testing device 600 the networking device 200, and the securing member actuators 410 are configured to cause the securing members 408 and 602 to disengage the networking device 200. One of skill in the art in possession of the present disclosure will recognize how the testing device 600 illustrated in FIG. 6 is but one of a variety of different testing devices that may be provided according to the teachings of the present disclosure in order to allow the testing devices discussed below to be secured to a networking device (e.g., by any number of securing members located anywhere on the testing device and configured to be disengaged from any portion of the networking device by securing member actuators).

Figure 7:
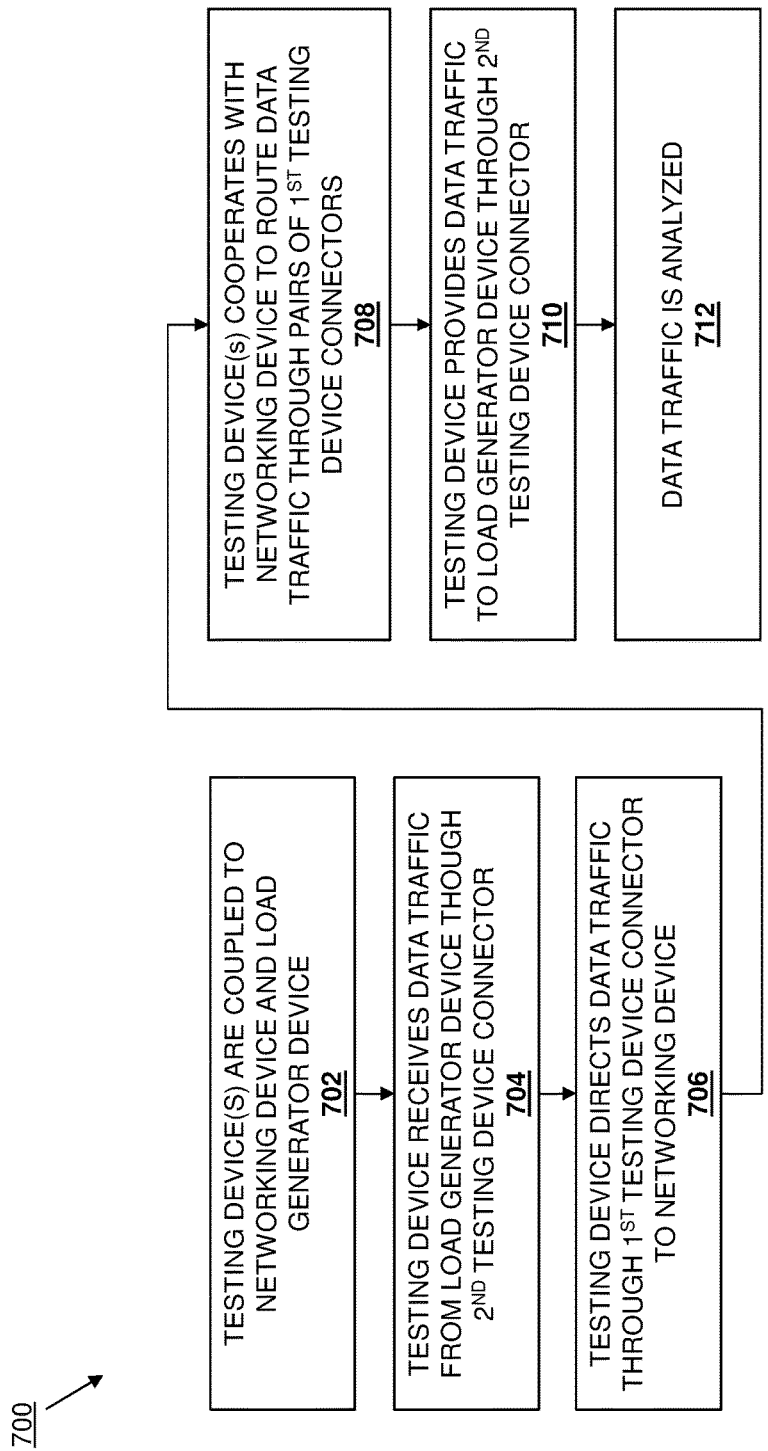
FIG. 7 is a flow chart illustrating an embodiment of a method for testing a networking device.

Referring now to FIG. 7, an embodiment of a method 700 for testing a networking device is illustrated. As discussed below, one or more testing devices may be provided according to the teachings of the present disclosure, and connected to a networking device that is to undergo testing. A load generator device may then be coupled to the testing device(s) and used to generate traffic that is provided through a testing device to the networking device. The networking device and the testing device(s) may then cooperate to route that data traffic through pairs of connectors on the testing device(s) such that the data traffic travels through each of the networking device connectors on the networking device, out of a final networking device connector on the networking device, and through a testing device to the load generator. The data traffic received at the load generator may then be compared to the data traffic provided by the load generator in order to test various characteristics of the networking device. One of skill in the art in possession of the present disclosure will recognize that the testing device(s) of the present disclosure provide for quick, efficient, and accurate setup and removal of the networking device testing system that overcomes the problems associated with conventional cabling that is used to provide conventional networking device testing systems.

The method 700 begins at block 702 where testing device(s) are coupled to a networking device and a load generator device. In the embodiment illustrated and described below, a pair of 24 connector testing devices are coupled to a 48 connector networking device, each other, and a load generator device in order to provide a networking device testing system. However, as discussed above, a single testing device, testing devices having different numbers of connectors, or different numbers of testing devices may be utilized to provide networking device testing systems for networking devices having any number of connectors (e.g., a 32 connector networking device may be testing using a 32 connector testing device, two 16 connector testing devices, one 16 connector testing device and two 8 connector testing devices, etc.) As such, it should be appreciated that networking device testing systems may be provided with sets of testing devices having different numbers of connectors that allow the testing of any of a variety of networking devices. For example, given the similarities of horizontal and vertical spacing between networking device connectors on a vast majority of the networking device currently available in the networking device market, the inventors of the subject matter of the present disclosure have found that approximately 10 different testing device configurations would cover 90% of the current networking device testing system market for currently available networking devices.

Figure 8:
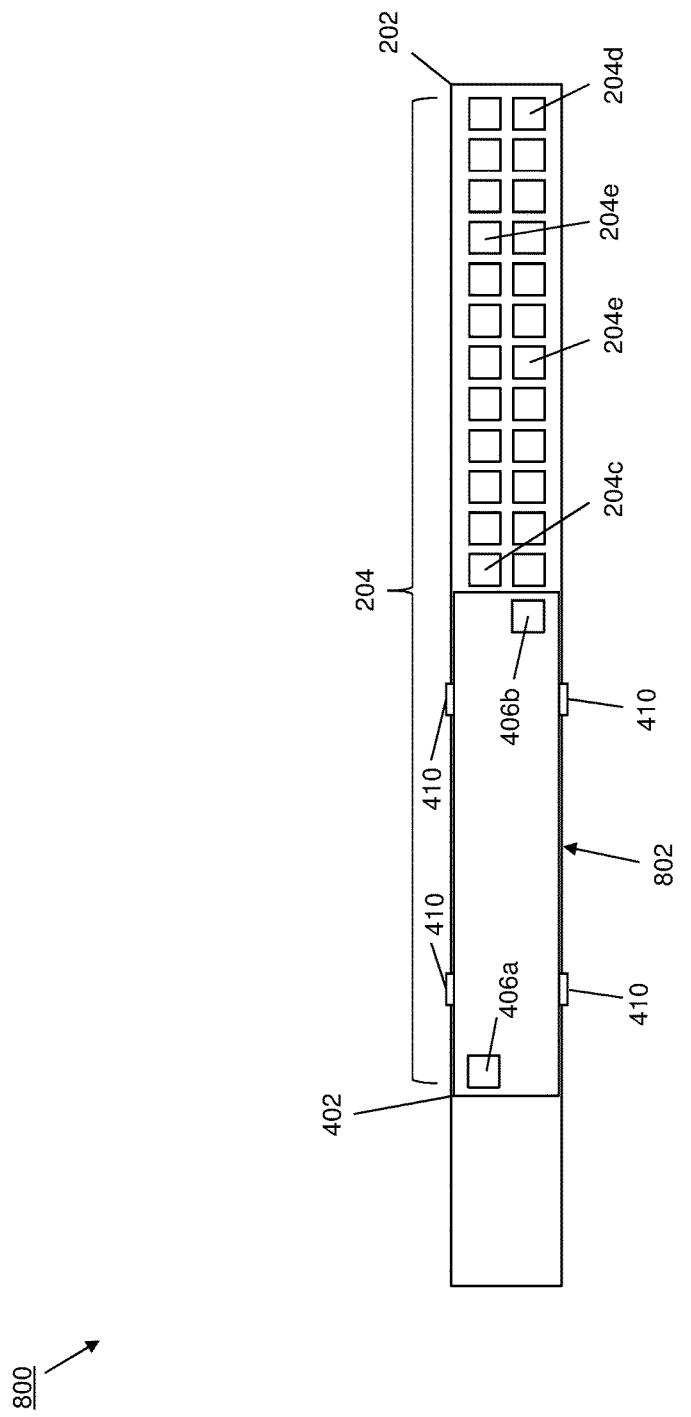
FIG. 8 is a front view illustrating an embodiment of a first testing device of FIGS. 4A-D connected to the networking device of FIGS. 2 and 3.

Referring to FIG. 8, and with reference to FIGS. 2 and 4A-4E, a first stage networking device testing system setup 800 is illustrated in which a first 802 of the testing devices 400 is connected to the networking device 200. For example, a user may position the first 802 of the testing devices 400 adjacent the networking device 200 such that its rear surface 402c is facing the chassis 202 of the networking device 200 with the first testing device connector 404a aligned with the networking device connector 204a, the first testing device connector 404b aligned with the networking device connector 204b, and the remaining first testing device connectors 404c aligned with respective networking device connectors 204c. The user may then move the first 802 of the testing devices 400 towards the networking device 200 such that the first testing device connector 404a engages the networking device connector 204a, the first testing device connector 404b engages the networking device connector 204b, and the remaining first testing device connectors 404c engage respective networking device connectors 204c. In addition, movement of the first 802 of the testing devices 400 towards the networking device 200 to engage the first testing device connectors and respective networking device connectors as discussed above causes the securing members 408 on its networking device securing subsystem to engage the networking device 200 to secure the first 802 of the testing devices 400 to the networking device 200, as illustrated in FIG. 8. While the securing members 408 are illustrated and described as being provided by conventional securing tabs on RJ-45 male connectors (i.e., the first testing device connectors 404c) that engage RJ-45 female connectors (i.e., the networking device connectors 204c) to secure their RJ-45 male connector in the RJ-45 female connectors, one of skill in the art will recognize that other types of securing members may be provided anywhere on the testing devices 400 and coupled to the networking device 200 in other manners (e.g., by engaging subsystems anywhere on the chassis 202 of the networking device 200) to secure the first testing device connectors in the networking device connectors while remaining within the scope of the present disclosure.

Figure 9:
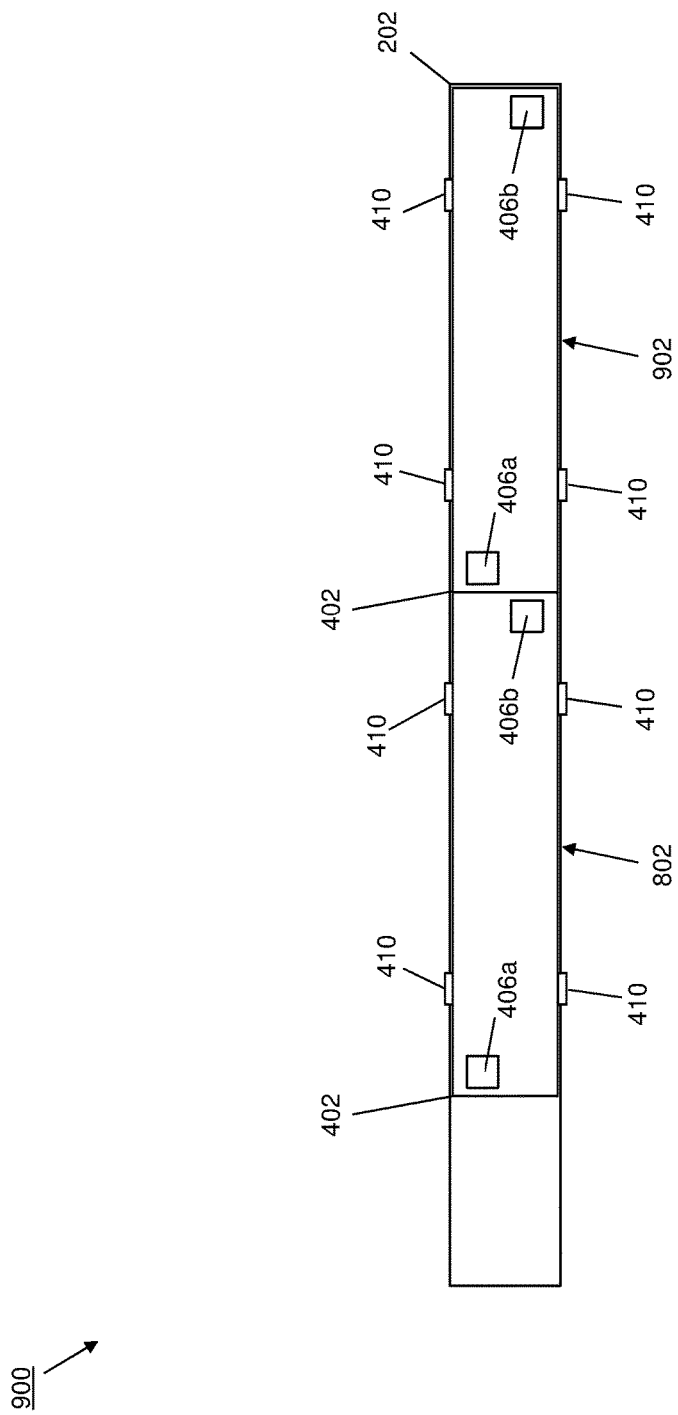
FIG. 9 is a front view illustrating an embodiment of a second testing device of FIGS. 4A-D connected to the networking device of FIG. 8.

Referring to FIG. 9, and with reference to FIGS. 2 and 4A-4E, a second stage networking device testing system setup 900 is illustrated in which a second 902 of the testing devices 400 is connected to the networking device 200. For example, a user may position the second 902 of the testing devices 400 adjacent the networking device 200 such that its rear surface 402c is facing the chassis 202 of the networking device 200 with the first testing device connector 404a aligned with the networking device connector 204c, the first testing device connector 404b aligned with the networking device connector 204d, and the remaining first testing device connectors 404c aligned with respective networking device connectors 204c. The user may then move the second 902 of the testing devices 400 towards the networking device 200 such that the first testing device connector 404a engages the networking device connector 204c, the first testing device connector 404b engages the networking device connector 204d, and the remaining first testing device connectors 404c engage respective networking device connectors 204c. In addition, movement of the second 902 of the testing devices 400 towards the networking device 200 to engage the first testing device connectors and respective networking device connectors as discussed above causes the securing members 408 on its networking device securing subsystem to engage the networking device 200 to secure the second 902 of the testing devices 400 to the networking device 200, substantially as described above and as illustrated in FIG. 9.

Figure 10:
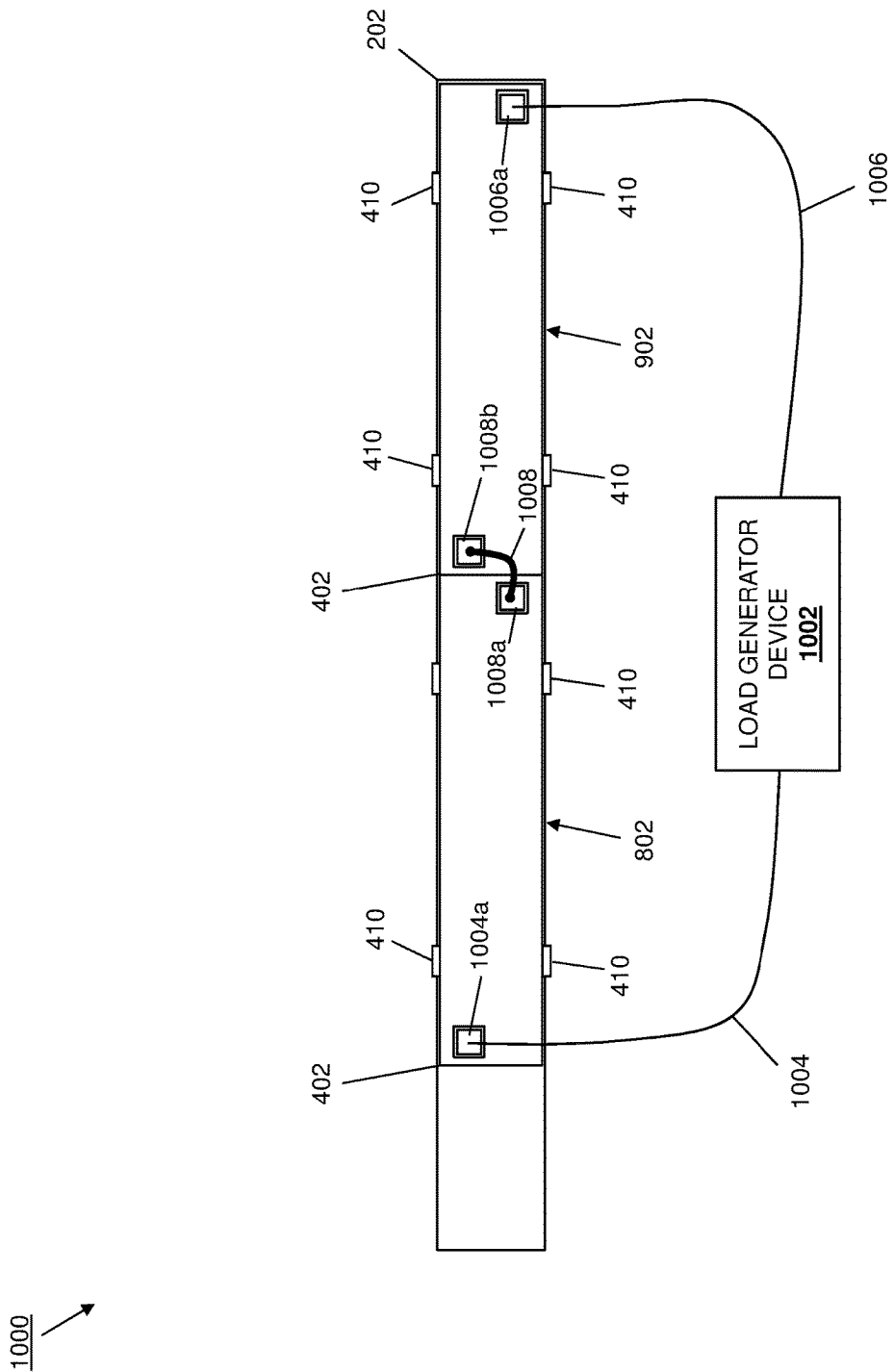
FIG. 10 is a front view illustrating an embodiment of a first and second testing device of FIG. 9 coupled to each other and a load generator device.

Referring now to FIG. 10, an embodiment of a networking device testing system 1000 is illustrated that is provided following the first stage networking device testing system setup 800 and the second stage networking device testing system setup 900 illustrated in FIGS. 8 and 9. In an embodiment, following the coupling of the first 802 and the second 902 of the testing devices 400 to the networking device 200 as discussed above, the user may couple a load generator device 1002 to the first 802 and the second 902 of the testing devices 400. For example, the user may couple a cable 1004 (e.g., an Ethernet cable) between the load generator device 1002 and the first 802 of the testing devices 400 by connecting a connector 1004a (e.g., an RJ-45 male connector) on the cable 1004 to the second testing device connector 406a on the first 802 of the testing devices 400, and connecting another connector (not illustrated) on that cable 1004 to the load generator device 1002, as illustrated in FIG. 10. Similarly, the user may couple a cable 1006 (e.g., an Ethernet cable) between the load generator device 1002 and the second 902 of the testing devices 400 by connecting a connector 1006a (e.g., an RJ-45 male connector) on the cable 1006 to the second testing device connector 404b on the second 902 of the testing devices 400, and connecting another connector (not illustrated) on that cable 1006 to the load generator device 1002, as illustrated in FIG. 10. In an embodiment, the load generator device 1002 may be a load generator device available from IXIA® of Calabasas, Calif., United States, a load generator device available from SPIRENT® Communications of Crawley, West Sussex, United Kingdom; a load generator device utilizing LOADRUNNER® available from HEWLETT-PACKARD® Company of Palo Alto, Calif., United States; and/or a variety of other load generator devices known in the art that are configured to provide the functionality discussed below.

Furthermore, the user may couple the first 802 of the testing devices 400 to the second 902 of the testing devices 400. For example, the user may couple a cable 1008 (e.g., an Ethernet cable) between the first 802 of the testing devices 400 and the second 902 of the testing devices 400 by connecting a connector 1008a (e.g., an RJ-45 male connector) on the cable 1008 to the second testing device connector 406b on the first 802 of the testing devices 400, and connecting a connector 1008b (e.g., an RJ-45 male connector) on the cable 1008 to the second testing device connector 406a on the second 902 of the testing devices 400, as illustrated in FIG. 10. With the first 802 and the second 902 of the testing devices 400 coupled to each other and the load generator device 1002, a networking device testing system 1000 is provided for testing a 48 connector networking device using two 24 connector testing devices. However, one of skill in the art in possession of the present disclosure will recognize that the setup of the networking device testing system may be modified when different testing devices and/or networking devices are used. For example, if a single testing device is used (e.g., a 48 connector testing device, the illustrated 24 connector testing device on a 24 connector networking device, etc.), the load generator 1002 may be connected via cabling directly to each of the second testing device connector 406a and 406b on that testing device. Furthermore, if more than two testing devices 400 are used (e.g., three 16 connector testing devices, the illustrated 24 connector testing device and two 12 connector testing devices, etc.), those testing devices 400 may be coupled together by cabling that is similar to the cable 1008 in a substantially similar manner as discussed above.

The method 700 then proceeds to block 704 where a testing device receives data traffic from the load generator device through a second testing device connector. Referring back to FIG. 10, and with reference to FIGS. 2, 3, and 4A-4E, in an embodiment of block 704, the first 802 of the testing devices 400 receives data traffic from the load generator device 1002 through its second testing device connector 406a. For example, the load generator device 1002 may generate first data traffic having first data traffic characteristics, and provide that first data traffic through the cable 1004 and the connector 1004a to the second testing device connector 406a on the first 802 of the testing devices 400. As discussed in further detail below, embodiments in which initial data traffic is provisioned at block 704 by the load generator device 1002 to the first 802 of the testing devices 400 via its second testing device connector 406a may be performed to test traffic flow through the networking device 200 in a first direction.

In another embodiment of block 704, the second 802 of the testing devices 400 receives data traffic from the load generator device 1002 through its second testing device connector 406b. For example, the load generator device 1002 may generate first data traffic having first data traffic characteristics, and provide that first data traffic through the cable 1006 and the connector 1006a to the second testing device connector 406b on the second 902 of the testing devices 400. As discussed in further detail below, embodiments in which initial data traffic is provisioned at block 704 by the load generator device 1002 to the second 802 of the testing devices 400 via its second testing device connector 406b may be performed to test traffic flow through the networking device 200 in a second direction that is opposite the first direction discussed above. One of skill in the art in possession of the present disclosure will recognize that a networking device test may involve performing blocks 702-712 of the method 700 multiple times to provide bi-direction data traffic (e.g., data traffic in each of the first direction and the second direction) through the networking device 200.

The method 700 then proceeds to block 706 where the testing device directs data traffic though a first testing device connector to the networking device. In an embodiment of block 706 in which data traffic is being provided through the networking device 200 in the first direction, discussed above, the first 802 of the testing devices 400 directs the data traffic received from the load generator device 1002 at block 704 through its first testing device connector 404a to the networking device 200. For example, data traffic received at the second testing device connector 406a on the first 802 of the testing devices 400 may be directed through the interconnect 412 to the first testing device connector 404a on the first 802 of the testing devices 400, and then provided to the networking device 200 via the connection of that first testing device connector 404a and the networking device connector 204a on the networking device 200.

In an embodiment of block 706 in which data traffic is being provided through the networking device 200 in the second direction, discussed above, the second 802 of the testing devices 400 directs the data traffic received from the load generator device 1002 at block 704 through its first testing device connector 404b to the networking device 200. For example, data traffic received at the second testing device connector 406b on the second 802 of the testing devices 400 may be directed through the interconnect 414 to the first testing device connector 404b on the second 902 of the testing devices 400, and provided to the networking device 200 via the connection of that first testing device connector 404b and the networking device connector 204d on the networking device 200.

The method 700 then proceeds to block 708 where the testing device(s) cooperate with the networking device to route data traffic through pairs of the first testing device connectors. In embodiments of block 708 in which data traffic is being provided through the networking device in the first direction, the networking device 200 may operate to repeatedly direct data traffic that is received from the first 802 of the testing devices 400 to networking device connectors 204e that are connected to the pairs of the first testing device connectors 404c on the first 802 of the testing devices 400 that route that data traffic back to the networking device 200 via the interconnects 416. For example, with reference to FIGS. 2, 3, and 4E, at block 708 the data traffic received through the networking device connector 204a at block 706 may be directed by the testing engine 304 to the networking device connector 204e that is illustrated in FIG. 2 as being positioned below the networking device connector 204a, which will result in that data traffic being provided to the first 802 of the testing devices 400 through the connection of that networking device connector 204e and the first testing device connector 404c that is illustrated in FIG. 4E as being positioned below the first testing device connector 404a. Furthermore, data traffic received by the first 802 of the testing devices 400 through that first testing device connector 404c (i.e., the first testing device connector 404c that is illustrated in FIG. 4E as being positioned below the first testing device connector 404a) is then directed via the interconnect 416 back to the networking device 200 through the connection of the first testing device connector 404c (which is illustrated in FIG. 4E as being immediately adjacent and to the right of the first testing device connector 404a) and the networking device connector 204e (which is illustrated in FIG. 2 as being immediately adjacent and to the right of the networking device connector 204a).

One of skill in the art in possession of the present disclosure will appreciate how the testing engine 304 in the networking device 200/300 may then direct that data traffic back to respective ones of the first testing device connectors 404c on the first 802 of the testing devices 400, and how the interconnects 416 may direct that data traffic back to the networking device 200/300, such that the data traffic received by the networking device 200 through the networking device connector 204a is routed through each of its networking device connectors 204e that are connected to respective first testing device connectors 404c on the first 802 of the testing devices 400. For example, with reference to FIGS. 2, 4E, and 10, this process at block 708 routes the data traffic in a left-to-right direction (relative to the Figures), with the data traffic repeatedly ingressing the networking device 200 via the networking device connector 204a and the top row of networking device connectors 204e that are located between the networking device connectors 204*a* and 204*c* in FIG. 2, and repeatedly egressing the networking device 200 via the bottom row of networking device connectors 204*e* that are located to the left of the networking device connector 204*b*, as well as the networking device connector 204*b*, in FIG. 2.

Data traffic egressing the networking device 200 via the networking device connector 204*b* may be received at the first testing device connector 404*b* on the first 802 of the testing devices 400 and directed through the interconnect 414 to the second testing device connector 406*b* on the first 802 of the testing devices 400. That data traffic may then be received through the connector 1008*a* and routed through the cable 1008 via the connector 1008*b* to the second 902 of the testing devices 400. The second 902 of the testing devices 400 receives that data traffic through its second testing device connector 406*a* and provides it to the networking device 200. For example, data traffic received at the second testing device connector 406*a* on the second 902 of the testing devices 400 may be directed through the interconnect 412 to the first testing device connector 404*a* on the second 902 of the testing devices 400, and provided to the networking device 200 via the connection of that first testing device connector 404*a* and the networking device connector 204*c* on the networking device 200.

Similarly as discussed above, the networking device 200 may operate to repeatedly direct data traffic that is received from the second 902 of the testing devices 400 to networking device connectors 204*e* that are connected to the pairs of the first testing device connectors 404*c* on the second 902 of the testing devices 400 that route that data traffic back to the networking device 200 via the interconnects 416. For example, with reference to FIGS. 2, 3, and 4E, at block 708 the data traffic received through the networking device connector 204*c* at block 706 may be directed by the testing engine 304 to the networking device connector 204*e* that is illustrated in FIG. 2 as being positioned below the networking device connector 204*c*, which will result in that data traffic being provided to the second 902 of the testing devices 400 through the connection of that networking device connector 204*e* and the first testing device connector 404*c* that is illustrated in FIG. 4E as being positioned below the first testing device connector 404*a*. Furthermore, data traffic received by the second 902 of the testing devices 400 through that first testing device connector 404*c* (i.e., the first testing device connector 404*c* that is illustrated in FIG. 4E as being positioned below the first testing device connector 404*a*) is then directed via the interconnect 416 back to the networking device 200 through the connection of the first testing device connector 404*c* (which is illustrated in FIG. 4E as being immediately adjacent and to the right of the first testing device connector 404*a*) and the networking device connector 204*e* (which is illustrated in FIG. 2 as being immediately adjacent and to the right of the networking device connector 204*c*).

One of skill in the art in possession of the present disclosure will appreciate how the testing engine 304 in the networking device 200/300 may then direct that data traffic back to respective ones of the first testing device connectors 404*c* on the second 902 of the testing devices 400, and how the interconnects 416 may direct that data traffic back to the networking device 200/300, such that the data traffic received by the networking device 200 through the networking device connector 204*c* is routed through each of its networking device connectors 204*e* that are connected to respective first testing device connectors 404*c* on the second 902 of the testing devices 400. For example, with reference to FIGS. 2, 4E, and 10, this process at block 708 continues to route the data traffic in a left-to-right direction (relative to the Figures), with the data traffic repeatedly ingressing the networking device 200 via the networking device connectors 204*c* and the top row of networking device connectors 204*e* that are located to the right of the networking device connector 204*c* in FIG. 2, and repeatedly egressing the networking device 200 via the bottom row of networking device connectors 204*e* that are located between the networking device connectors 204*b* and 204*d*, as well as the networking device connector 204*d*, in FIG. 2.

Without repeating substantially the same discussion detailed above for the first direction/left-to-right data traffic, one of skill in the art will appreciate that the second direction/right-to-left data traffic, which is provided when initial data traffic is provisioned at block 704 by the load generator device 1002 to the second 802 of the testing devices 400 via its second testing device connector 406*b*, may be routed by the first 802 and the second 902 of the testing devices and the networking device 200 in a similar manner. As such, in those embodiments and with reference to FIGS. 2, 4E, and 10, data traffic may be routed in the right-to-left direction (relative to the Figures), with the data traffic repeatedly ingressing the networking device 200 via the networking device connector 204*d*, the bottom row of networking device connectors 204*e* that are located between the networking device connectors 204*b* and 204*d*, and the bottom row of networking device connectors 204*e* that are located to the left of the networking device connectors 204*b* in FIG. 2, and repeatedly egressing the networking device 200 via the top row of networking device connectors 204*e* that are located to the right of the networking device connector 204*c*, the top row of networking device connectors 204*e* that are located between the networking device connector 204*a* and 204*c*, and the networking device connector 204*a* in FIG. 2.

The method 700 may then proceed to block 710 where a testing device provides data traffic to the load generator device through a second testing device connector. In an embodiment of block 706 in which data traffic is being provided through the networking device 200 in the first direction, the second 902 of the testing devices 400 directs the data traffic received from the networking device 200 at block 708 to the load generator device 1002. For example, data traffic received from the networking device connector 204*d* at the first testing device connector 404*b* on the second 902 of the testing devices 400 may be directed through the interconnect 414 to the second testing device connector 406*b* on the second 902 of the testing devices 400, and provided to the load generator device 1002 via the connection of that second testing device connector 406*b*, the connector 1006*a* on the cable 1006, and through the cable 1006 to the load generator device 1002.

In another embodiment of block 710 in which data traffic is being provided through the networking device 200 in the second direction, the first 802 of the testing devices 400 directs the data traffic received from the networking device 200 at block 708 to the load generator device 1002. For example, data traffic received from the networking device connector 204*a* at the first testing device connector 404*a* on the first 802 of the testing devices 400 may be directed through the interconnect 412 to the second testing device connector 406*a* on the first 802 of the testing devices 400, and provided to the load generator device 1002 via the connection of that second testing device connector 406*a*, the connector 1004*a* on the cable 1004, and through the cable 1004 to the load generator device 1002.

The method 700 then proceeds to block 712 where the data traffic is analyzed. In an embodiment, the load generator device 1002 may include a data traffic analysis subsystem that is configured to analyze the data traffic received from the networking device 200/testing device(s) 400 at block 710. In another embodiment, a data traffic analysis subsystem (e.g., e.g., an IHS) may be coupled to the load generator device 1002 and configured to analyze the data traffic received from the networking device 200/testing device(s) 400 at block 710. In a specific embodiment, the analysis of the data traffic at block 710 may include comparing the data received from the networking device 200/testing device(s) 400 at block 710 to the data traffic sent to the networking device 200/testing device(s) 400 at block 704 to determine whether any changes to that data traffic have occurred.

For example, as discussed above, at block 704 the load generator device 1002 may provide first data traffic having first data traffic characteristics to the networking device 200/testing device(s) 400 and, at block 710, the load generator device may receive back that same first data traffic with those same first data traffic characteristics. As such, the data traffic analysis subsystem may determine at block 712 that no changes have occurred to the first data traffic or first data traffic characteristics during its transmission through the networking device 200/testing device(s) 400, and thus the networking device 200 may be considered to be operating properly. In another example, at block 704 the load generator device 1002 may provide the first data traffic having the first data traffic characteristics to the networking device 200/testing device(s) 400 and, at block 710, the load generator device may receive back second data traffic having second data traffic characteristics that is different than the first data traffic having the first data traffic characteristics. As such, the data traffic analysis subsystem may determine at block 712 that changes have occurred to the first data traffic and/or first data traffic characteristics during its transmission through the networking device 200/testing device(s) 400, and thus the networking device 200 may be considered to be defective. While a specific example of a test/data traffic analysis has been provided, one of skill in the art in possession of the present disclosure will recognize that a variety of testing may be performed using the networking device testing system of the present disclosure, including load testing, throughput testing, latency testing, and/or other networking device testing known in the art.

Following the method 700, the networking device testing system 100 may be disassembled by disconnecting the load generator device 1002 from the first 802 and second 902 of the testing devices 400 via the disconnection of the connectors 1004a and 1006a on the cables 1004 and 1006, respectively, from the second testing device connectors 406a and 406b, respectively, on the first 802 and second 902 of the testing devices 400, respectively. Furthermore, the first 802 and second 902 of the testing devices 400 may be disconnected from each other via the disconnection of the connectors 1008a and 1008b on the 1008, from the second testing device connectors 406b and 406a, respectively, on the first 802 and second 902 of the testing devices 400, respectively. Each of the first 802 and second 902 of the testing devices 400 may then be disconnected from the networking device 200 by engaging the securing member actuators 410 on that testing device 400 (e.g., by using the thumb and forefinger on each hand to move the securing member actuators 410 on that testing device 400 towards each other) to cause the securing members 408 to disengage from the networking device 200 so that that testing device 400 may be moved away from the networking device 200 to cause the first testing device connectors 404a, 404b, and 404c to disengage the networking device connectors on the networking device 200.

Thus, systems and methods have been described that provide testing device(s) that provide for the setup and disassembly of a networking device testing system in a fraction of the time of conventional networking device testing systems (e.g., 20 to 30 minutes vs. less than a minute) while reducing the errors in networking device testing system setup that are associated with the time-consuming and inaccurate methods of separately cabling pairs of networking device connectors on the networking device. As discussed above, a single testing device may be configured to connect all of the networking device connectors on a networking device in order to perform testing, thus requiring simply connecting that testing device to the networking device and cabling that testing device with two cables to the load generator device. As also discussed above, combinations of testing devices may be utilized to connect all of the networking device connectors on a networking device in order to perform testing, thus requiring simply connecting those testing devices to the networking device, cabling pairs of those testing devices together with cable, and cabling two of those testing devices with two cables to the load generator device. One of skill in the art in possession of the present disclosure that has conducted conventional "snake" testing on a networking device will immediately recognize the improved setup accuracy and time savings that result from using testing devices according to the teachings herein.

Figure 11A:
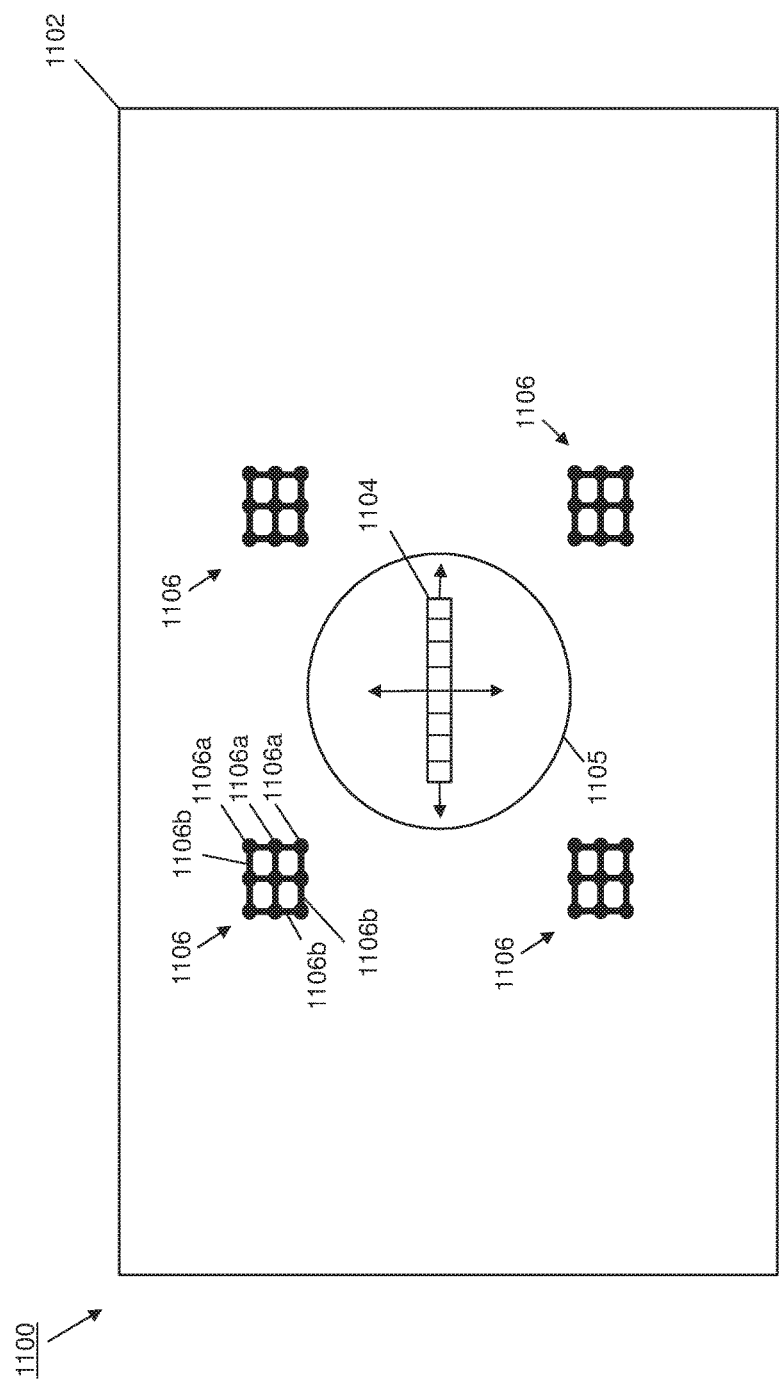
FIG. 11A is a front view of an embodiment of a testing device chassis having a moveable/configurable connector coupling.

Referring now to FIG. 11A, an embodiment of a testing device connector subsystem 1100 is illustrated. In the illustrated embodiment, a portion of a testing device chassis 1102 is illustrated that may be provided on any of the testing device chassis discussed above (e.g., the chassis 402 of FIGS. 4A-4E) and that is configured to couple a single testing device connector (e.g., the first testing device connectors 404a, 404b, and 404c) to the testing device chassis 1102. It should be understood that the structure illustrated in FIG. 11B may be provided for a single testing device connector or any subset of the testing device connectors on the testing devices discussed above in order to allow those testing device connector(s) to be positioned on the testing device chassis in a configuration that matches the networking device connectors on a networking device that is to be tested.

A connector coupling 1104 is provided in the testing device chassis 1102 and is moveable in a cavity 1105 defined by the testing device chassis 1102 (e.g., as indicated by the arrows extending from the connector coupling 1104), and may be connected or coupled to any of the interconnects 412, 414, and/or 416 that are discussed above for coupling together testing device connectors on the testing device 400. In the specific illustrated embodiment, the connector coupling 1104 includes 8 contacts (e.g., for coupling to 8 contacts on a male RJ-45 connector), but may include any of a variety of electrical contact features to provide for a moveable electrical coupling between the testing device connector and the interconnect 414, 414, and/or 416. A plurality of testing device connector positioning features 1106 are provided on the testing device chassis 1102 and located about the perimeter of the connector coupling 1104. In the illustrated embodiment, the testing device connector positioning features 1106 are illustrated as including discrete locating elements 1106a (i.e., the 9 circles illustrated on each testing device connector positioning feature 1106) and positioning channels 1006b (i.e., the 12 lines illustrated on each testing device connector positioning feature 1106 that connect the 9 circles), and as discussed below, testing device connectors may be provided with features that engage the testing device connector positioning features 1106 and that may be moved through the positioning channels 1106b to become seated in the locating elements 1006a to provide a desired position for that testing device connector on the testing device chassis 1102. However, one of skill in the art in possession of the present disclosure will also recognize that the specific testing device connector positioning features 1106 illustrated in FIG. 11A may be replaced by a variety of other moveable electrical couplings that may be provide connection, removal, and/or continuously/integrally adjustable positioning of the testing device connectors while remaining within the scope of the present disclosure.

Figure 11B:
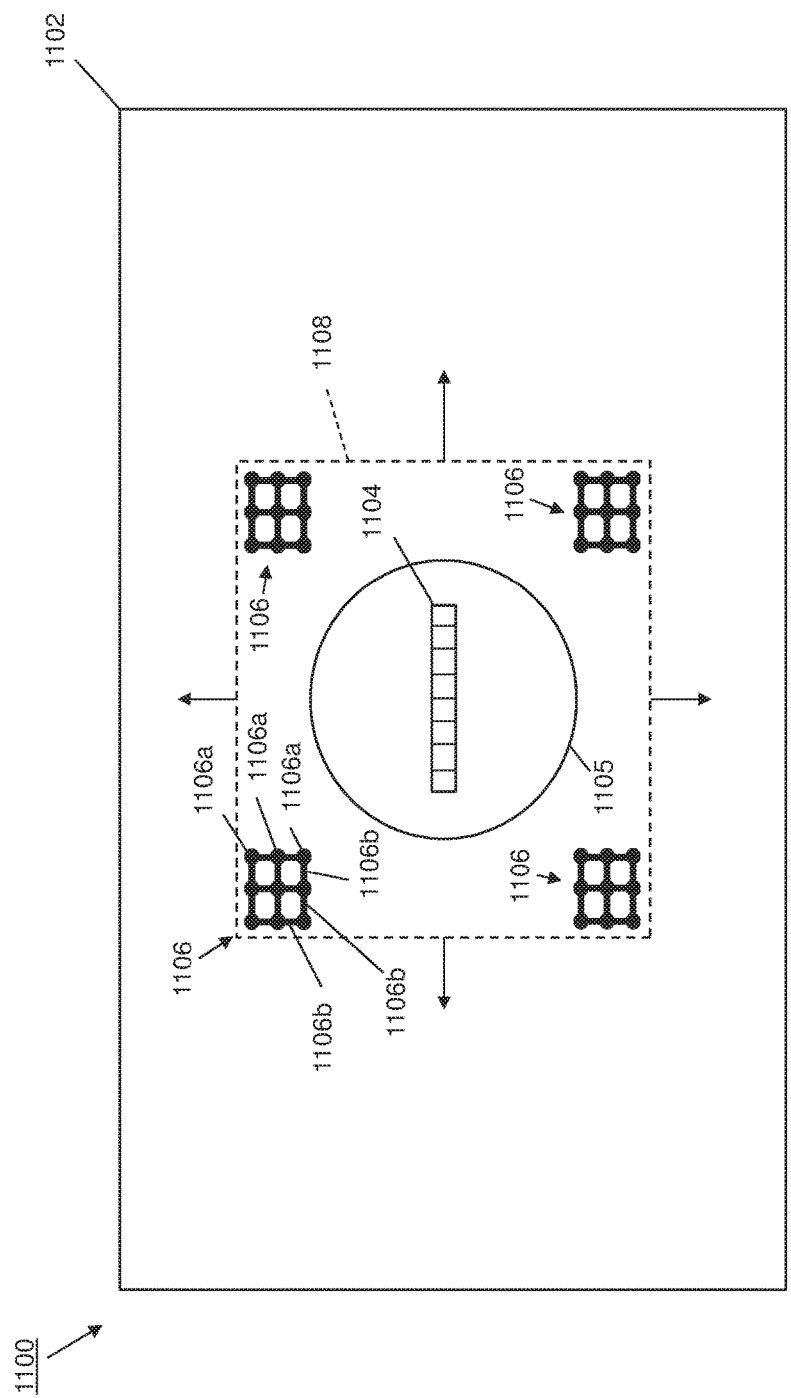
FIG. 11B is a front view of an embodiment of a connector coupled to the testing device of FIG. 11A such that the connector is moveable/configurable relative to the testing device chassis via the moveable/configurable connector coupling.

Referring now to FIG. 11B, a testing device connector 1108 is illustrated coupled to the testing device connector subsystem 1100, and may be any of the testing device connectors discussed above. The testing device connector 1108 may include features (not illustrated) that are configured to engage respective ones of the testing device connector positioning features 1106 on the testing device chassis 1102 to connect the testing device connector 1008 to the testing device chassis 1102 and, as discussed above, to allow the testing device connector 1008 to move relative to the testing device chassis 1102 (e.g., via the positioning channels 1006b on the testing device connector positioning features 1106) and be held in a desired position (e.g., via the locating elements 1106a on the testing device connector positioning features 1106). Furthermore, the testing device connector 1108 may include one or more electrical contacts (e.g., 8 contacts on a male RJ-45 connector) that are configured to engage the connector coupling 1004 while being moved into any of the configurable positions of the testing device connector 1108 on the testing device connector subsystem 1100, thus providing for the electrical connection of the testing device connector 1108 to any of the interconnects 412, 414, and 416 that are electrically connected to the connector coupling 1104.

In a specific embodiment, the testing device connector subsystem 1100 may be provided for each of the first testing device connectors 404a, 404b, and 404c on the testing device 400, or combinations of the testing device connectors (e.g., subsets of 8 testing device connectors may be moveable relative to the testing device chassis 1102 using features similar to those illustrated in FIGS. 11A and 11B), and used to add testing device connectors, remove testing device connectors, and position testing device connectors on the chassis 402 to configure the testing device connectors on the testing device 400 for any networking device connector configuration on any networking device. Furthermore, the testing device connector subsystem 1100 may provide for testing device connectors that "self-align" or "self-adjust" to the configuration of networking device connectors on a networking device. For example, a user may position a testing device adjacent a networking device such that the first testing device connectors discussed above are substantially aligned with the networking device connectors. Movement of the testing device towards the networking device will then cause the first testing device connectors to engage respective networking device connectors, while also moving relative to the testing device chassis via the connector couplings 1106, to provide for self-alignment or self-adjustment of the first testing device connectors that changes the configuration of the first testing device connectors based on variations in the relative positioning of the networking device connectors. Thus, testing devices according to the teachings of the present disclosure may be configurable so that the number, positioning, types, and/or other characteristics of the testing device connectors may be selected by a user to conform to any networking device to be tested.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device testing system, comprising:
a load generator device;
a networking device including a plurality of networking device connectors; and
a testing device that is connected to the load generator device and the networking device, wherein the testing device includes:
a testing device chassis;
a plurality of first testing device connectors that are included on the testing device chassis and that are each connected to a respective one of the plurality of networking device connectors to connect the testing device to the networking device, wherein pairs of the plurality of first testing device connectors are coupled together such that traffic received through one of the first testing device connectors in each pair is directed to the other of the first testing device connectors in each pair; and
a plurality of second testing device connectors that are included on the testing device chassis, wherein at least one of the plurality of second testing device connectors is connected to the load generator device to connect the testing device to the load generator device, wherein each of the plurality of second testing device connectors is coupled to a respective one of the plurality of first testing device connectors.

2. The networking device testing system of claim 1, wherein each of the plurality of first testing device connectors is a male connector, and wherein each of the plurality of second testing device connectors is a female connector.

3. The networking device testing system of claim 1, further comprising:
a networking device securing subsystem included on the testing device chassis, wherein the networking device securing subsystem includes:
at least one securing member, wherein each at least one securing member is located adjacent a respective one of the first testing device connectors and engages the networking device to secure the testing device to the networking device; and
at least one securing member actuator that is configured to actuate the at least one securing member to disengage the at least one securing member from the networking device to allow the testing device to be disconnected from the networking device.

4. The networking device testing system of claim 1, wherein the load generator device is configured to:
generate first data traffic;
provide the first data traffic to the networking device through a first of the plurality of second testing device connectors; and
receive the first data traffic from the networking device that was sent through a second of the plurality of second testing device connectors.

5. The networking device testing system of claim 4, wherein the load generator device is configured to:
   generate second data traffic;
   provide the second data traffic to the networking device by sending the second data traffic through the second of the plurality of second testing device connectors; and
   receive the second data traffic from the networking device from the first of the plurality of second testing device connectors.

6. The networking device testing system of claim 1, further comprising:
   a first cable that couples a first of the plurality of second testing device connectors directly to the load generator device; and
   a second cable that couples a second of the plurality of second testing device connectors directly to the load generator device.

7. The networking device testing system of claim 1, wherein the testing device is a first testing device, and wherein the networking device testing system includes:
   a second testing device that is connected to the load generator device and the networking device, wherein the second testing device includes:
      a testing device chassis;
      a plurality of first testing device connectors that are included on the testing device chassis and that are each connected to a respective one of the plurality of networking device connectors to connect the second testing device to the networking device, wherein pairs of the plurality of first testing device connectors are coupled together such that traffic received through one of the first testing device connectors in each pair is directed to the other of the first testing device connectors in each pair; and
      a plurality of second testing device connectors that are included on the second testing device chassis and that are connected to the load generator device to connect the second testing device to the load generator device, wherein each of the plurality of second testing device connectors is coupled to a respective one of the plurality of first testing device connectors; and
   a first cable that couples a first of the plurality of second testing device connectors on the first testing device directly to the load generator device;
   a second cable that couples a respective one of the plurality of second testing device connectors on the first testing device directly to a respective one of the plurality of second testing device connectors on the second testing device; and
   a third cable that couples a respective one of the plurality of second testing device connectors on the second testing device directly to the load generator device.

8. A testing device, comprising:
   a testing device chassis;
   a plurality of first testing device connectors that are included on the testing device chassis and that are each configured to connect to a respective one of a plurality of networking device connectors on a networking device, wherein pairs of the plurality of first testing device connectors are coupled together such that traffic received through one of the first testing device connectors in each pair is directed to the other of the first testing device connectors in each pair; and
   a plurality of second testing device connectors that are included on the testing device chassis, wherein at least one of the plurality of second testing device connectors is configured to connect to a load generator device, wherein each of the plurality of second testing device connectors is coupled to a respective one of the plurality of first testing device connectors.

9. The testing device of claim 8, wherein each of the plurality of first testing device connectors is a male connector, and wherein each of the plurality of second testing device connectors is a female connector.

10. The testing device of claim 8, further comprising:
    a networking device securing subsystem included on the testing device chassis, wherein the networking device securing subsystem includes:
       at least one securing member, wherein each at least one securing member is located adjacent a respective one of the first testing device connectors and is configured to engage the networking device to secure the testing device to the networking device; and
       at least one securing member actuator that is configured to actuate the at least one securing member to disengage the at least one securing member from the networking device to allow the testing device to be disconnected from the networking device.

11. The testing device of claim 8, wherein the testing device is configured, when the plurality of first testing device connectors are connected to respective ones of the plurality of networking device connectors on the networking device, to:
    receive data traffic from a load generator device through a first of the plurality of second testing device connectors;
    route, in cooperation with the networking device, the data traffic from the first of the plurality of second testing device connectors, through the pairs of the plurality of first testing device connectors, and to a second of the plurality of second testing device connectors; and
    provide the data traffic to the load generator through the second of the plurality of second testing device connectors.

12. The testing device of claim 11, wherein the testing device is configured, when the plurality of first testing device connectors are connected to respective ones of the plurality of networking device connectors on the networking device, to:
    receive data traffic from a load generator device through the second of the plurality of second testing device connectors;
    route, in cooperation with the networking device, the data traffic from the second of the plurality of second testing device connectors, through the pairs of the plurality of first testing device connectors, and to the first of the plurality of second testing device connectors; and
    provide the data traffic to the load generator through the first of the plurality of second testing device connectors.

13. The testing device of claim 8, wherein the at least one of the plurality of second testing device connectors is configured to connect to the load generator device by:
    a first cable that couples a first of the plurality of second testing device connectors directly to the load generator device; and
    a second cable that couples a second of the plurality of second testing device connectors directly to one of:
       the load generator device; and
       a different testing device.

14. A method for testing a networking device, comprising:
receiving, by a testing device from a load generator device through a first of a plurality of second testing device connectors that are included on a testing device chassis, first data traffic;
directing, by the testing device from the first of the plurality of second testing device connectors and through a first of a plurality of first testing device connectors that are included on the testing device chassis and that are each connected to a respective networking device connector on a networking device, the first data traffic to the networking device;
routing, by the testing device in cooperation with the networking device, the first data traffic through pairs of the plurality of first testing device connectors are coupled together such that traffic received through one of the first testing device connectors in each pair is directed to the other of the first testing device connectors in each pair; and
providing, by the testing device through a second of the plurality of second testing device connectors that are included on the testing device chassis, the first data traffic that was routed through the pairs of the plurality of first testing device connectors such that the data traffic is provided to the load generator device.

15. The method of claim 14, wherein each of the plurality of first testing device connectors is a male connector, and wherein each of the plurality of second testing device connectors is a female connector.

16. The method of claim 14, further comprising:
engaging, by at least one securing member on the testing device that is located adjacent a respective one of the first testing device connectors, the networking device to secure the testing device to the networking device; and
disengaging, by the at least one securing member on the testing device, the networking device in response to the actuation of at least one securing member actuator on the testing device to allow the testing device to be disconnected from the networking device.

17. The method of claim 14, further comprising:
receiving, by the testing device from a load generator device through the second of the plurality of second testing device connectors, second data traffic;
directing, by the testing device from the second of the plurality of second testing device connectors and through the second of the plurality of first testing device connectors, the second data traffic to the networking device;
routing, by the testing device in cooperation with the networking device, the second data traffic through the pairs of the plurality of first testing device connectors; and
providing, by the testing device through the first of the plurality of second testing device connectors, the second data traffic that was routed through the pairs of the plurality of first testing device connectors such that the second data traffic is provided to the load generator device.

18. The method of claim 14, further comprising:
receiving, by the first testing device via first of the plurality of second testing device connectors, a first cable that couples directly to the load generator device; and
receiving, by the first testing device via second of the plurality of second testing device connectors, a second cable that couples directly to the load generator device.

19. The method of claim 14, wherein the testing device is a first testing device, and wherein the method further comprises:
receiving, by the first testing device via the first of the plurality of second testing device connectors, a first cable that couples directly to the load generator device; and
receiving, by the first testing device via the second of the plurality of second testing device connectors, a second cable that couples directly to a second testing device.

20. The method of claim 19, further comprising:
receiving, by the second testing device from the first testing device through a first of the plurality of second testing device connectors that are included on a second testing device chassis, the first data traffic;
directing, by the second testing device from the first of the plurality of second testing device connectors on the second testing device chassis and through a first of a plurality of first testing device connectors that are included on the second testing device chassis and that are each connected to a respective networking device connector on the networking device, the first data traffic to the networking device;
routing, by the second testing device in cooperation with the networking device, the first data traffic through pairs of the plurality of first testing device connectors are coupled together such that traffic received through one of the first testing device connectors in each pair is directed to the other of the first testing device connectors in each pair; and
providing, by the second testing device through a second of the plurality of second testing device connectors that are included on the testing device chassis, the first data traffic that was routed through the pairs of the plurality of first testing device connectors on the second testing device chassis directly to the load generator device.

* * * * *